United States Patent [19]
McClellan et al.

[11] Patent Number: 5,619,250
[45] Date of Patent: Apr. 8, 1997

[54] OPERATING SYSTEM FOR INTERACTIVE TELEVISION SYSTEM SET TOP BOX UTILIZING DYNAMIC SYSTEM UPGRADES

[75] Inventors: Stephen R. McClellan, Clive; Eric B. Miller, Grimes, both of Iowa

[73] Assignee: Microware Systems Corporation, Clive, Iowa

[21] Appl. No.: 480,930

[22] Filed: Jun. 7, 1995

Related U.S. Application Data

[63] Continuation-in-part of Ser. No. 389,899, Feb. 19, 1995, abandoned.

[51] Int. Cl.⁶ .................................................. H04N 7/173
[52] U.S. Cl. ...................... 348/10; 348/13; 455/6.2
[58] Field of Search ..................... 348/10, 11, 12, 348/13, 7, 6.2; 455/5.1, 4.2, 6.1, 6.3; 358/85; 380/5, 10, 15, 20; H04N 71/16, 7/173

[56] References Cited

U.S. PATENT DOCUMENTS

| | | | |
|---|---|---|---|
| 5,371,692 | 12/1994 | Draeger et al. | 364/580 |
| 5,440,632 | 8/1995 | Bacon et al. | 348/12 |

Primary Examiner—John K. Peng
Assistant Examiner—Chris Grant
Attorney, Agent, or Firm—Henderson & Sturm

[57] ABSTRACT

A set top box for digital audio/video interactive decoding in an interactive television system is disclosed. The set top box includes means for connecting to an interactive television system as well as means for connecting to a television set. The set top box includes a CPU on which is run a real time operating system. The operating system is comprised of modules of code. Each module of code makes up a portion or component of the overall system. A description record is created for each module which includes the device type and device name and can also include the device parameters. The description records are stored in a configuration description block. The description block is stored in RAM and can be updated at any time. If a new system module is downloaded from the interactive television system, a description record corresponding to the new module can be added to the description block. Thus, real time system upgrades are accomplished without the need for user interaction and without the need for restarting the system. The updated system modules can either be stored in RAM for session only upgrades or the upgrade modules can be stored in FLASH memory for extended updating.

20 Claims, 5 Drawing Sheets

OPERATING SYSTEM FOR INTERACTIVE TELEVISION SYSTEM SET TOP BOX UTILIZING DYNAMIC SYSTEM UPGRADES

CROSS REFERENCE TO RELATED APPLICATIONS (CLAIMING BENEFIT UNDER 35 U.S.C. 120)

This application is a continuation-in-part of U.S. application Ser. No. 08/389,899 filed Feb. 16, 1995 now abandoned by Stephen R. McClelland.

AUTHORIZATION PURSUANT TO 37 CFR 1.71 (d)(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to set top boxes for use in an interactive television system and more particularly to an improved operating system which accommodates system upgrades in real time.

BACKGROUND ART

Interactive television systems are being developed and tested by various telephone and cable companies. These systems will allow users to interact with large computer systems operated by the telephone and cable companies via their television sets. The potential for interactive television is great. Users of the systems will be able to access movies on demand, pay bills, bank, shop, place orders, make reservations, participate in interactive games and forums, access informational data bases and perform numerous other functions in addition to accessing the traditional television stations.

The interactive systems are designed to allow for two-way digital communication between the providing company and the user. In the systems under development by the telephone companies, the communication will be accomplished over existing telephone lines. However, as mentioned, the communication will be digital, not analog, which will allow for much higher data transfer rates which are required, for example, to access a movie. The use of the telephone lines for two-way multi-media interaction has been called video dial tone. In the case of the systems being developed by the cable companies, the existing cable line will be used. As with the telephone systems, the communication will be two-way and will be digital. Appropriately, the cable based interactive television systems have been referred to as digital two-way cable. In both the telephone and the cable systems, the communication can be a combination of digital and analog signals.

The goal of the systems is to provide a user friendly interface at the user end. The systems require that the user have a computer/decoder similar to the need for having a cable decoder in traditional cable systems. These computer/decoders for the interactive television systems have become known as set top boxes referring to the fact that these boxes will be set on top of the television set, or at least in close proximity. These computer/decoders, or set top boxes, for the interactive television systems also can reside inside the television housing itself in a fashion similar to the cable boxes which originally resided outside in a separate box but now are incorporated inside the television housing. Each set top box will include a remote control which will provide for the user interface and interaction between the user and the interactive television system. Other input devices can also be used to customize the manner in which selections are made. Thus, the user will access the services of interactive television, make decisions, enter choices, play games and the like using the remote control and other input devices.

For example, a user may decide that she wishes to watch a movie. Using the remote control, the user will select the movie category from an option menu. The user then makes appropriate selections from the menu driven choices, using the remote control, until she has selected the particular movie she wishes to watch. At this point the interactive television system accesses the information for this movie and prepares to begin downloading it, segment by segment, to the set top box. At the user end, the remote control now functions similarly to a remote control for a VCR. Thus the user can play, pause, rewind and fast forward. The set top box controls the two-way communication. It sends the commands from the user to the interactive television system as well as accepts the digitized movie information, encoded in MPEG (Motion Picture Experts Group) or MPEG 2 format, for example, and converts it into a format acceptable to the television such as NTSC, PAL, HDTV or SECAM.

In the case of users placing orders, and for illustrative purposes, the specific example of a user placing a food order, the user might select, utilizing the remote control, the restaurant selection from an options menu. In well developed systems, the user could then select the listing of restaurants by some sort of preference. For example, the user may select by type of cuisine, by restaurants offering carry-out or delivery, in order of proximity to the user, alphabetically within a certain radius of the user, and so on. If the user selects pizza restaurants offering delivery, the appropriate list will be displayed for the user. The user then selects the particular restaurant, type of pizza, payment method, preference for delivery time, maximum wait time and any other relevant information for which the system prompts. The system will then automatically place the order with the pizza restaurant.

As can be seen in these examples, the emphasis is on easy access and interface for the user. The cost of this ease for the user is complexity in the set top box and in the interactive television system. One of the concerns relating to the complexity of the set top boxes, and the concern addressed by this invention, is the need for upgrading the system inside the set top box as system requirements change or evolve. As discussed, the set top box is a multimedia computer. However, unlike other computers used for multimedia, two additional criteria must be satisfied. First, the system must be able to handle tasks in real time, and second, the requirements of the set top box user must be kept at a minimum from a technical standpoint.

For example, if a user has selected a particular game he wishes to play, and the game requires a system driver or system software which his set top box does not have or which is newer than the version in his set top box, the set top box must somehow be upgraded in order to allow the user to play this particular game. The traditional computer solution requires that the user obtain the new software, either by purchasing, contacting the software company or possibly downloading off a computer service or bulletin board. The user must then load the software into the computer, typically through a disk drive, modify the system and restart the computer such that the new software is incorporated into the system.

This solution is unacceptable in the interactive television environment for several reasons. First, the goal of the set top boxes and interactive television systems is to create an environment which is user friendly even for users not proficient in any type of computing. Second, even for computer proficient users, the time required for user upgrading is too great from a convenience perspective. Users of the system will not want to have to wait hours or days in order to receive the new software to upgrade their set top boxes. Third, user upgrading would most certainly require that there be some form of disk drive in the set top box. This requirement is unacceptable due to the increased cost factors and because of the goal to make the computer aspects of the set top box embedded such that the end user does not feel like he is using a computer. Finally, after making changes to a computer system, the user typically must restart the computer. It is not convenient or desirable to have the user be required to turn off and then restart the set top box.

One proposed solution to this problem has been to provide only a minimal system in the set top box which provides just enough functionality for the set top box to connect with the interactive television system. Once the connection has been established, the interactive television system downloads a complete operating system to the set top box which will include all of the most current system components. The minimum system will then utilize the downloaded system and perform a full system boot with all of the latest system components. This solution solves the problem of having an outdated version of a system component as well as the problem of not having a particular system component. However, there would seem to be several disadvantages associated with this type of approach.

The downloading of all system components is best described as a brute force solution. Thus, it requires that any system component that could possibly be needed be downloaded. This is disadvantageous for various reasons. One reason is that it creates a large system with components that may not be needed. Also, the larger the system, the longer the delay until the system has booted and the user may start interacting. Furthermore, there is additional time required because the entire system must be downloaded each time over the network as opposed to, for example, the system residing inside the set top box. Finally, the brute force solution requires that the system software be loaded into and run from RAM (Random Access Memory) necessitating that the set top box be RAM intensive which can add additional cost to the set top box.

Thus, there is a need for a set top box in which resides the majority of the operating system and which allows for the operating system to be upgraded in real time without requiring action on the part of the user which might include the need for restarting the system.

DISCLOSURE OF THE INVENTION

The present invention relates generally to set top boxes for use in an interactive television system and more particularly to an improved operating system which accommodates system upgrades in real time. The set top box system utilizes a real time, multi-tasking operating system. The system is divided into modules. Each module performs a particular function such as a device driver, system manager, or other system function.

The set top box of the present invention also includes a CPU (central processing unit), RAM, ROM and FLASH memory, an interface to connect to the interactive television system which is fundamentally a high bandwidth wide area network, and an interface to a television set. The set top box also contains numerous other components such as a power supply, a data bus, a low bandwidth control channel interface, an infrared remote control receiver and audio output jacks. However, this second set of components, while necessary, will not be discussed in great detail because they are only secondarily related to the present invention.

Some of the system modules are stored in the ROM memory. Upon start-up, the system begins its initialization procedures. As part of the initialization procedures, the system identifies all of the system modules and identifies a description record for each. Each description record includes the device type and device name and can also include the device parameters. A configuration description block is generated in which each of the description records are place. The configuration description block provides a textual, though coded, description of the entire set top box system. The configuration description block can be accessed by application programs in order to determine the configuration of the system.

The configuration description block need not be stored in one contiguous portion of memory but may be comprised of several components stored in different types of memory. Thus, a component of the configuration description block could be stored permanently in ROM which includes the description records for the modules permanently maintained in ROM. Similarly, there could be FLASH components to the configuration description block which stores the description records for the modules stored in FLASH. Finally, there could be temporary components of the configuration description block stored in RAM which contains the description records for the modules which are temporarily maintained in RAM.

If the system is not suitable for running a particular application program because a module, or device driver, is missing or outdated, the set top box will request that the necessary module be downloaded from the interactive television system. Upon receiving the new module, the system places a description record for the new module in the configuration description block. The new module is then fully operational with no need to restart the system. Additionally, the entire upgrade is performed by the set top box without interaction from the user.

The new, downloaded module can be placed either in RAM or FLASH memory. If the new module is placed in RAM, it will only be available for that particular initialized session. Therefore, the configuration block including the description record for the module in RAM is most appropriately also maintained in RAM. If the module is placed in FLASH memory, the new module will be identified each time the system is initialized, or turned on, and will be included in the configuration description block that is located in FLASH memory.

An object of the present invention is to provide an improved operating system for use in a set top box connected to an interactive television system.

Another object of the present invention is to provide an improved operating system for use in a set top box connected to an interactive television system which requires a minimal amount of technical or system operational user activity.

Another object of the present invention is to provide an improved operating system for use in a set top box which utilizes a real-time, multi-tasking operating system which is separated into modules.

A further object of the present invention is to provide an improved operating system for use in a set top box which utilizes a description record for each system module and which places each description record in a configuration description block.

Another object of the present invention is to provide an improved operating system for use in a set top box which allows for new or additional system modules to be downloaded after system initialization which are functional without the need for re-initializing the operating system.

Still another object of the present invention is to provide an improved operating system for use in a set top box which allows for a downloaded system module to be stored in FLASH memory such they remain available after future operating system initializations.

Other objects, advantages, and novel features of the present invention will become apparent from the following detailed description of the invention when considered in conjunction with the accompanying drawings.

BEST MODES FOR CARRYING OUT THE INVENTION

Figure 1:
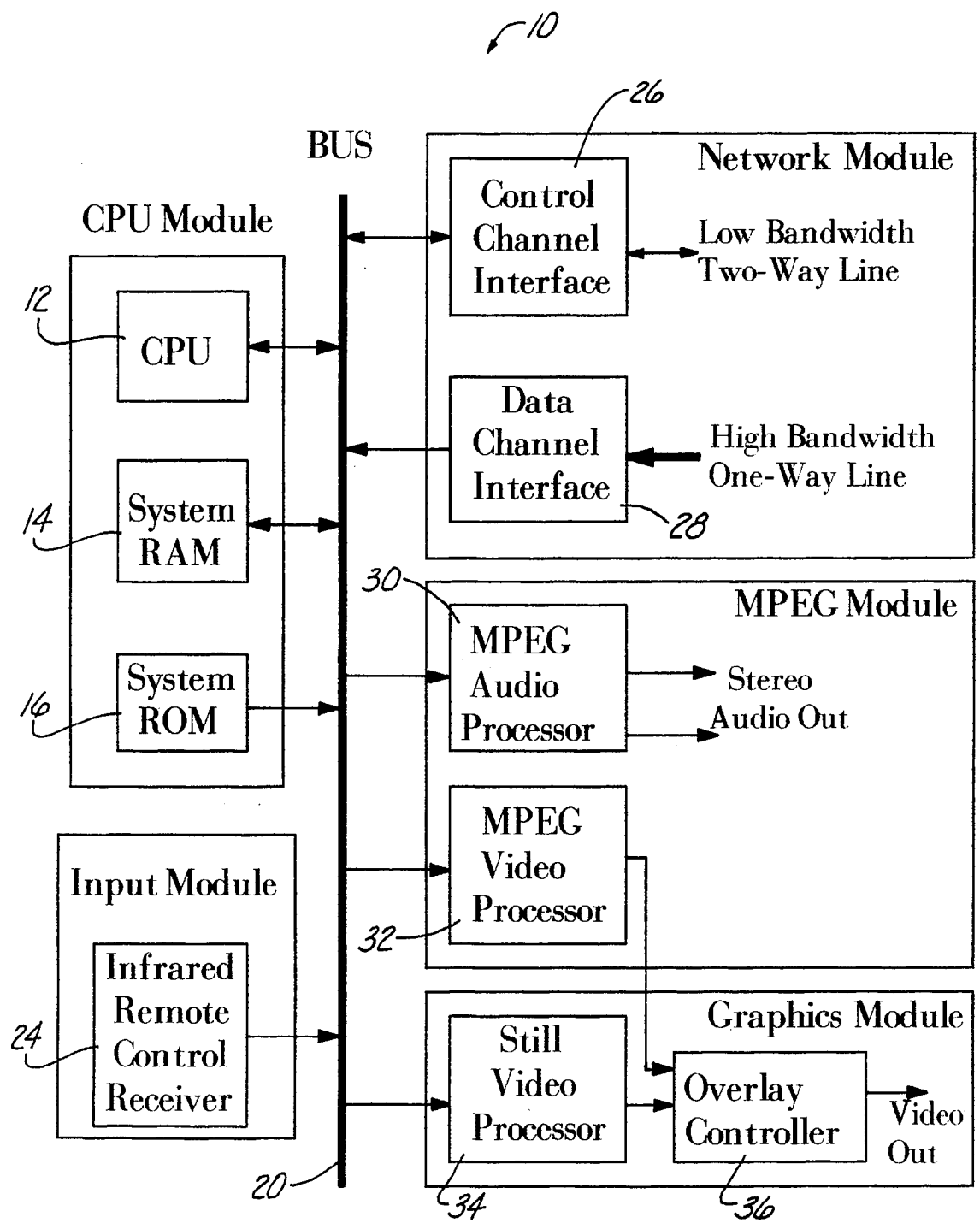
FIG. 1 is a block diagram of the system hardware architecture for the digital audio/video interactive decoding system.

Referring now to the drawings wherein like reference numerals designate identical or corresponding parts throughout the several views, FIG. 1 shows a block diagram of the system hardware for a digital audio/video interactive decoding (DAVID) system (10) built in accordance with the present invention. The decoding system (10) includes a central processing unit (12), or CPU, system RAM (14), and system ROM (16). The decoding system (10) also includes a data bus (20) which allows for data communication between the various components of the system (10).

A detailed description of the operation of the digital audio/video interactive decoding (DAVID) system is included in the DAVID™ System Specification which is hereby incorporated by reference in its entirety.

The decoder system (10) also includes an infrared remote control receiver (24) which receives infrared signals from a remote control or other user input devices (not shown). The decoder system (10) connects to an interactive television system via a control channel interface (26) and a data channel interface (28). The control channel interface (26) allows for two-way, low bandwidth communication between the set top box decoding system (10) and the interactive television system. Utilizing the two-way control channel interface (26) allows for user requests and information to be sent to the interactive television system. Additionally, channel control information can be sent from the interactive television system to the decoder system (10) via the control channel interface (26). The data channel interface (28) allows for one-way, high bandwidth communication for transferring data from the interactive television system to the decoding system (10). The infrared remote control receiver (24), the control channel interface (26) and the data channel interface (28) are all connected to the data bus (20). Obviously various communication strategies could be employed for realizing communication between the set top box and the interactive television system.

The decoder system (10) also includes an MPEG audio processor (30) and an MPEG video processor (32) for processing MPEG data which is downloaded from the interactive television system. The MPEG audio processor (30) decodes the downloaded MPEG audio information and provides an audio out signal which can be connected to the television, separate stereo or any other audio device. The MPEG video processor (32) decodes the downloaded MPEG video information and provides a video signal. The video signal is sent to an overlay controller (36) which also receives a video signal from the still video processor (34). The MPEG audio processor (30) and the MPEG video processor (32) are both connected to the data bus (20).

The still video processor (34), also referred to as the graphical relay video processor, processes video information which is not in the MPEG format. For example, it may process the information relating to option menus which are created by the operating system or an application program which is currently residing in the RAM (14) of the system (10). The overlay controller (36) combines, or overlays, the video signals from the MPEG video processor (32) and the still video processor (34) and generates a video out signal which is sent to the television set. The output signal is in a format which the television set can decode such as NTSC (national television system committee), PAL (phase alternating line), HDTV (high definition television) or SECAM (système en couleurs à mémoire).

The operating system for the decoding system (10) is stored in the system ROM (16). The operating system is a real-time multi-tasking operating system and in a preferred embodiment is based on the OS/9 or OS/9000 Operating System by Microware Systems Corporation. The operating system is comprised of system modules. Each module performs a particular function such as a device driver, system manager or other system function. Upon initialization of the system (10), each system module is identified. Also, a corresponding description record for each module is identified. A configuration description block is created into which each description record is placed. The configuration description block thus provides for a summary of the capabilities of the operating system. The configuration description block is not created each time the system is initialized but instead is modified each time a new module is added to the system.

For example, the modules which are stored in ROM are permanently part of the operating system even though they may eventually be outdated because they are stored n ROM and therefore cannot be removed. Similarly, new modules cannot be added to the ROM since it is not possible to write to ROM. Thus, the modules remain constant and a configuration description block component containing all of the description records for the ROM modules is best also permanently stored in ROM. When a new module is added into RAM, a configuration description block component with the corresponding description record is also created in RAM either by creating a new RAM component of the configuration description block or by modifying a configuration description block component already in RAM. The configuration description block is comprised of all of the components located in one or more of the memory locations.

When an application program is loaded into the set top box system (10), typically into RAM (14), and then run, it will begin by accessing the configuration description block. When an application program accesses the configuration description block, the application checks to see if the set top box system (10) includes all of the necessary system modules and device drivers required to run that particular application program. The application program may find the system insufficient in one of two ways. First, the system may not have a necessary module or device driver. Second, the system may have a particular module or device driver that is necessary to run the application program, but it may be outdated. For example, the revision number for a particular module may be 2.3, but the application requires the newer module, conceivably 3.0 or later. In the case of a missing module or the case of an outdated module, the application program cannot run until the system is updated.

When an operating system is found to be insufficient, a request is sent from the decoder system (10) to the interactive television network for the new module or modules. The new modules are then downloaded, along with a corresponding description record, from the interactive television system to the set top box decoding system (10). The operating system places the new description records in the configuration description block. With the description records in the configuration description block, the new modules are fully functional and there is no need to restart the system or perform any form of system reconfiguration. The entire upgrade procedure is performed by the set top box decoder system (10) without the need for interaction from the user.

The new modules downloaded from the interactive television system are placed in RAM (14). Therefore, they are only available to the system during the current initialized session. That is, when the system is shut off, or reinitialized, the module stored in RAM (14) will be lost. The embodiment of the present invention discussed in FIG. 2 addresses this situation.

Figure 2:
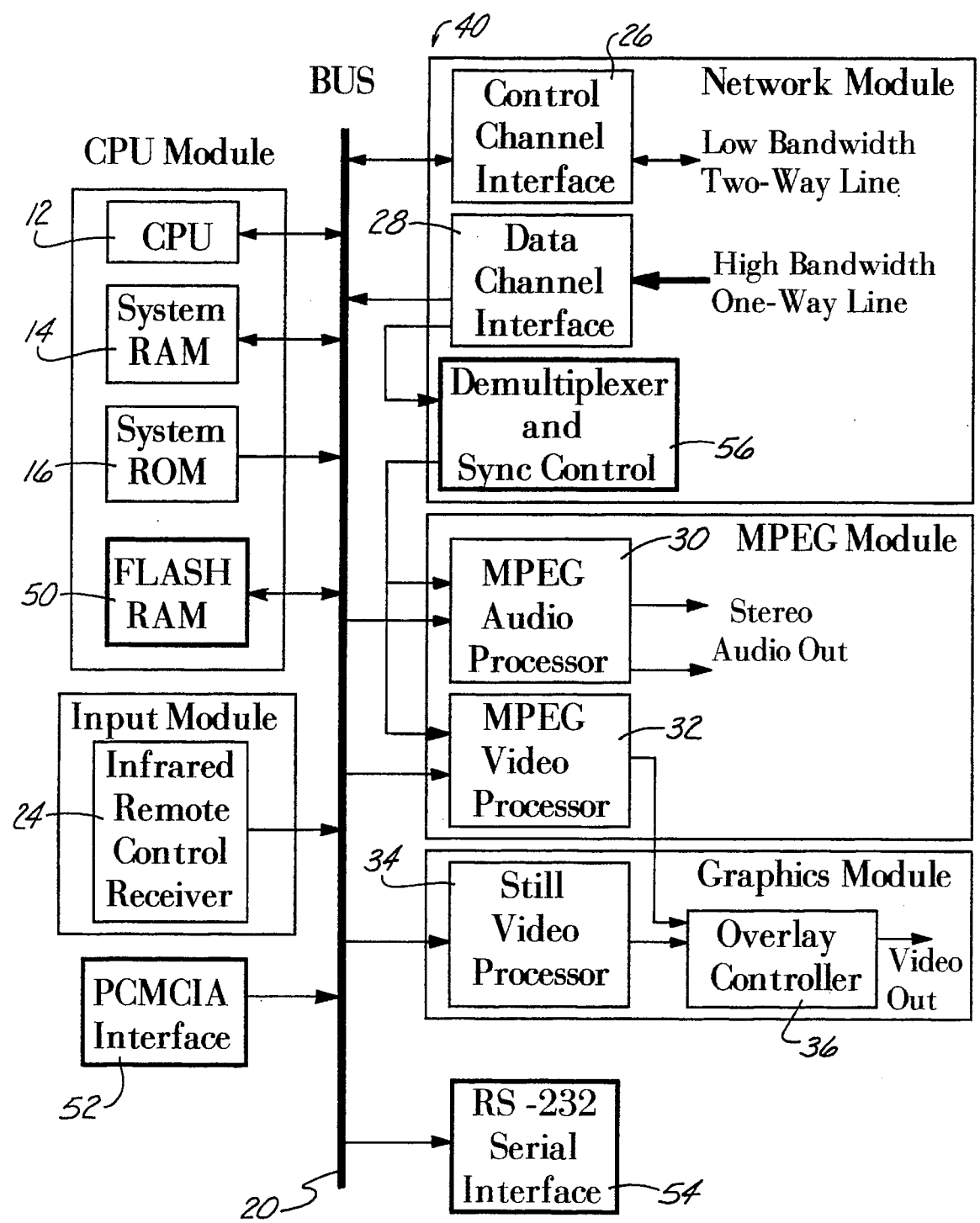
FIG. 2 is a block diagram of the system hardware architecture for the enhanced digital audio/video interactive decoding system.

Referring now to FIG. 2, a block diagram of the system hardware for an enhanced digital audio/video interactive decoding system (40) built in accordance with the present invention is shown. The decoding system (40), or set top box, includes all of the components of the system described in FIG. 1. Additionally, the decoding system includes a FLASH memory (50), a PCMCIA interface (52), an RS-232 serial interface (54), and a demultiplexer and synchronization controller (56). The FLASH memory (50), the PCMCIA interface (52), and the RS-232 serial interface (54) are connected to the data bus (20) while the demultiplexer and synchronization controller (56) interfaces between the data channel interface (28) and the MPEG audio processor (30) and the MPEG video processor (32).

The PCMCIA interface (52) allows for the addition of a PCMCIA card slot which accepts PCMCIA cards. The PCMCIA cards could be used to provide a variety of enhancements such as a data storage device, additional RAM, system upgrades in the form of additional upgrade modules, a ROM type data device on which is stored one or more applications, as well as any of the other enhancements available through the use of a PCMCIA card.

The RS-232 serial interface (54) allows for the connection of an external device to the set top box decoder system (40). Numerous external devices could be attached such as a data storage device (hard drive) for the saving of information retrieved through the interactive television system, an input device such as a joystick or game controller, a printer, a personal computer, or any other external device typically connected to a computer type device.

The demultiplexer and synchronization controller (56) is used for separating audio/video data bound for real-time processing by the MPEG audio processor (30) and the MPEG video processor (32) from application or other non-MPEG data.

For the purposes of the present invention, the FLASH memory (50) is the most significant additional feature of this embodiment of the decoding system (40). When a new module is downloaded from the interactive television system, it can either be placed in RAM (14) or FLASH memory (50). As discussed previously, if the new module is placed in RAM (14), it will be lost when the system is shut off or reinitialized. However, if the new module is placed in FLASH memory (50) the module will remain even after the system has been shut off or reinitialized. Thus, the FLASH memory (50) allows for system upgrades to be extended beyond the current session.

The decision whether to place an upgrade module in FLASH memory (50), and therefore make the upgrade lasting, or in RAM (14), and therefore make the upgrade temporary, is a system specific protocol problem. The system must base the decision on several factors including the importance of the module, the size of the new module, the amount of unused FLASH memory (50) available and so on. For example, a specific module used for the playing of a particular game might not warrant saving that module beyond the current session. Therefore it would be stored in RAM memory (14) and lost either at the conclusion of the game or, at the latest, at the powering down of the system. Conversely, an updated MPEG video processor device driver which will be used on a regular basis would be stored in FLASH memory (50) such that it would be available for future sessions.

Similarly to the discussion above when referring to the system (10) of FIG. 1, the configuration description block is modified each time a new module is added. With respect to modules that are added and stored in the FLASH memory, a description record corresponding to each of the modules is placed in the FLASH component of the configuration description block. Similarly, if a module is removed from either FLASH or RAM, the corresponding description record must be removed from the configuration description block.

By way of example, suppose a module is located in ROM. Also in ROM is the configuration description block with the description record corresponding to the module. Next, a second updated version of the module becomes available and is downloaded from the interactive television system to the set top box and is stored in FLASH. The FLASH configuration description block is now modified to include a description record for the second version of the module. Thus, the system configuration description block will include description records for both the original and the second version of the module. If an application program attempts to call on the module, the system will automatically select the later version of the module. Next, a third version of the module arrives and is placed in FLASH and the configuration description block is updated to include a description record of the third version. At this point, the operating system may elect to remove the second version from the FLASH since memory availability is typically at a premium. If the second version of the module is removed, the configuration description block will be modified such that the description record for the second version also will be removed.

It is not necessary that the configuration description block components be stored in the same type of memory as the modules. Another embodiment of the present invention could include a system which generates a configuration description block in RAM only. Thus, during initialization, the description records for all the modules in the system could be placed in a configuration description block which is generated each time the system is initialized in RAM. This configuration description block would be modified in a like fashion as described above. Similarly, the entire configuration description block could be stored in FLASH.

When the decoder system (40) is initialized, typically only when the set top box is turned on, the CPU (12) searches through ROM (16), as before, for any system modules. Additionally, the CPU (12) searches through FLASH memory (50) for any system modules. The CPU (12) can locate system module by a unique identification character sequence with which all system modules must begin. Additionally, following the unique character sequence is a file size field indicating the size of the module. The CPU (12) can use the file size information to find the end of the file and determine if there is an appropriate end-of-file marker. Also, the CPU (12) can use information found either after the unique identification sequence or in the end-of-file maker to perform a validity check on the module. These tests enable the CPU (12) to be certain that it is identifying actual system modules and not misidentifying random data.

If a data device containing system modules were attached via the PCMCIA interface (52) or the RS-232 serial interface (54), the CPU could search for system module and include a description record for each module in the configuration description block as described above. The CPU could search the PCMCIA interface (52) or the RS-232 serial interface (54) either at initialization or at a later time. As a practical matter, the system would have to be initialized at least partially such that the device driver modules for the PCMCIA interface (52) or the RS-232 serial interface (54) would be loaded.

Figure 3:
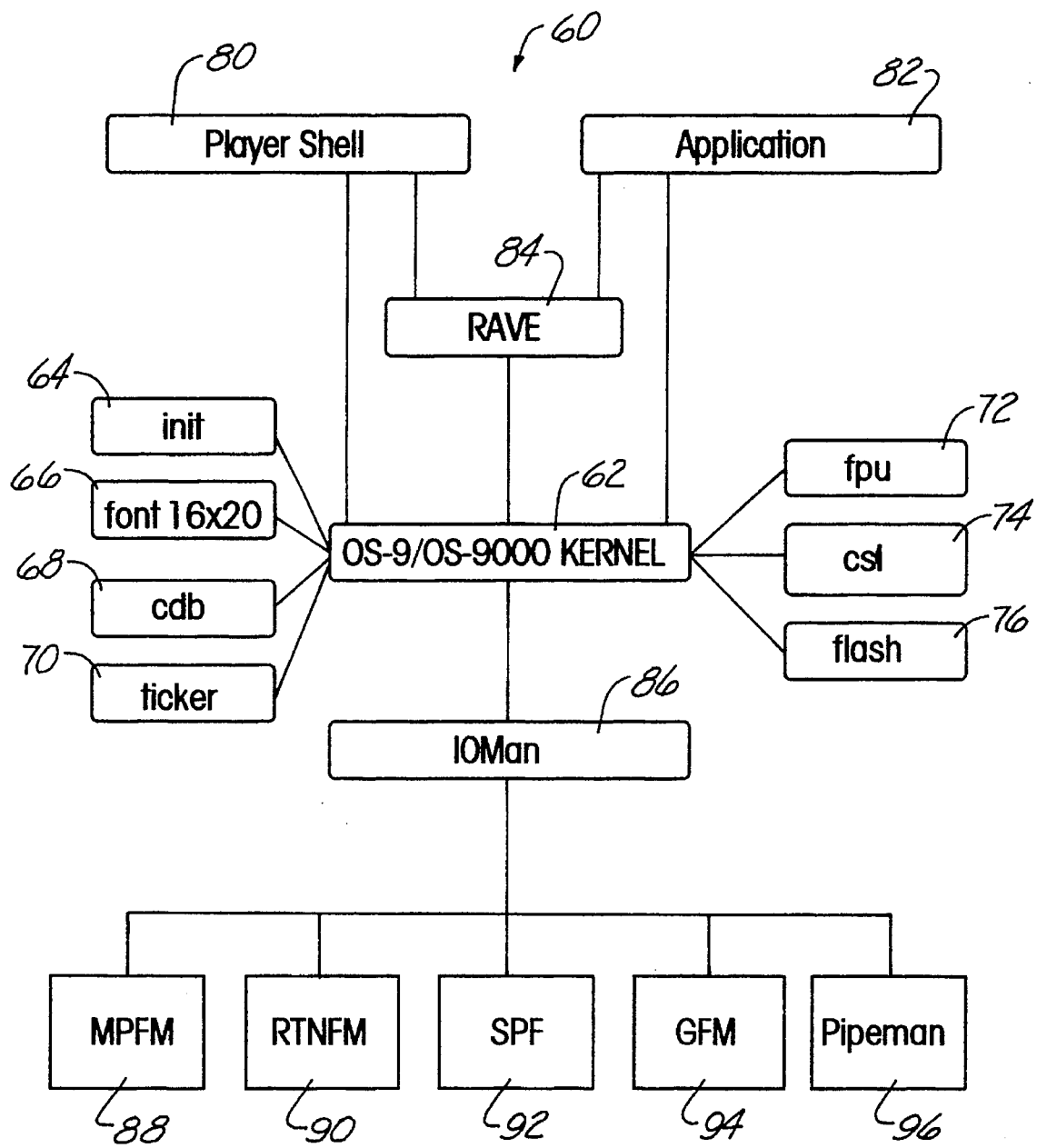
FIG. 3 is a block diagram showing the set top box operating system separated into modules.

Referring now to FIG. 3, a block diagram showing the set top box operating system modules is shown. At the heart of the operating system (60) is the kernel (62). As mentioned above, in a preferred embodiment of the present invention, the operating system is based on Microware's OS/9 or OS/9000 Operating System. The init module (64) is used by the kernel (62) during system initialization. The font 16×20 module (66) is the font module used by the player shell (80). The player shell (80) is responsible for preparing the system for interaction with the interactive television network and finding the initial application to be executed. The cdb module (68) is the configuration description block described above. The ticker module (70) is a system module utilized by OS/9 and OS/9000 operating systems and is describe in detail in their accompanying technical manuals which are well known in the art.

The fpu (floating point unit) module (72) and the csl (c-shared library) module (74) are C programming modules utilized by the kernel (62) and are described in detail in the *Using Ultra C* manual which is well known in the art. The flash module (76) is the trap handler used for writing to the FLASH memory.

The IOMan module (86) is the Input/Output Manager and interface between the kernel (62) and the other I/O managers. The MPFM (MPEG File Manager) module (88) manages the MPEG audio and video subsystems. The RTNFM (Real-Time Network: File Manager) module (90) manages the high bandwidth input data channel. The SPF (Serial or Sequential File Manager) module (92) manages the low bandwidth serial control channel. The GFM (Graphic File Manager) module (94) manages the graphics overlay planes and remote controller. The Pipeman module (96) manages interprocess communications. In another embodiment of the present system (60), the GFM (Graphic File Manager) module (94) can be replaced with a UCM (User Communication Manager) module (not shown).

The Application (82) is not really an operating system module as described above but is included to show the interrelations of the entire system. The RAVE program (84) is a system program used to control the real-time audio/video environment.

Figure 5:
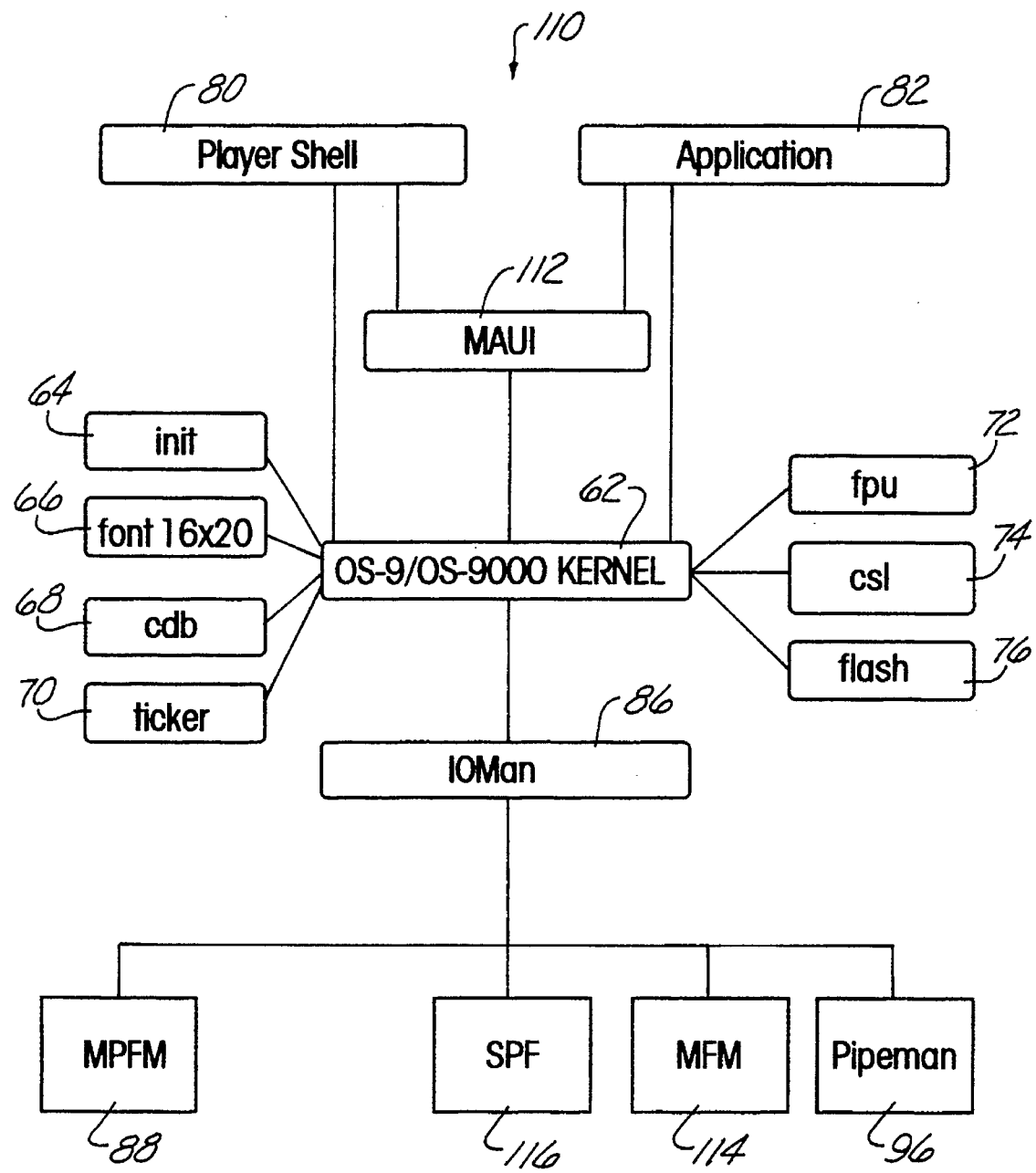
FIG. 5 is a block diagram showing another set top box operating system separated into modules.

Referring now to FIG. 5, a block diagram for another operating system (110) for a set top box is shown. The system (110) is similar to the system discussed in reference to FIG. 3 with the primary exception that this system utilizes the MAUI (Multimedia Application User Interface) program (112) instead of the RAVE program (84). Other differences include using the MFM (MAUI File Manager) module (114) instead of the GFM (Graphic File Manager) module (94) and that, in the MAUI system, the SPF (Serial or Sequential Packet Manager) module (116) manages both the high bandwidth input channel and the low bandwidth serial control channel.

Figure 4:
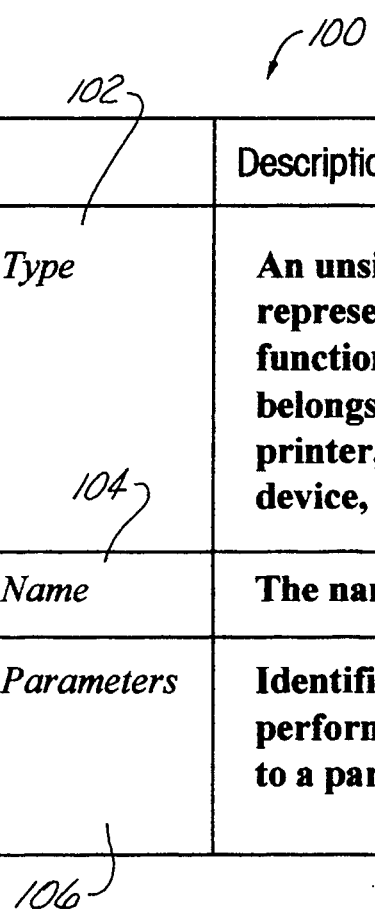
FIG. 4 is a diagram showing by textual description the information contained in a description record.

Referring to FIG. 4, a diagram showing the textual description of the information contained in a description record (100) is shown. The description record (100) includes at least two fields including the device type (102) and the device name (104), and optionally can also include the device parameters (106).

Obviously, many modifications and variations of the present invention are possible in light of the above teachings. It is therefore understood that, within the scope of the appended claims, the invention may be practiced otherwise than as specifically described.

We claim:

1. A digital audio/video interactive decoding system for use in interactive television system connected to a wide area network, comprising:

a CPU;

a RAM memory;

a ROM memory;

an operating system, said operating system comprising modules of code wherein each module of code performs a particular function;

wherein each module includes a corresponding description record;

a configuration description block;

means for storing said description record for each module in said configuration description block;

means for downloading system modules and corresponding description records from said network; and means for adding said description record for each of said downloaded system module to said configuration description block.

2. The digital audio/video interactive decoding system of claim 1 wherein at least one downloaded system module is stored in said RAM memory after downloading.

3. The digital audio/video interactive decoding system of claim 1 wherein said configuration description block is comprised partially in said RAM memory and partially in said ROM memory.

4. The digital audio/video interactive decoding system of claim 3 wherein the configuration description records corresponding to modules stored in said ROM memory are stored in the ROM portion of said configuration description block and wherein the configuration description records corresponding to modules stored in said RAM memory are stored in the RAM portion of said configuration description block.

5. The digital audio/video interactive decoding system of claim 1 wherein said configuration description block is stored entirely in said RAM memory and includes the configuration description records for the modules stored in said RAM memory and the configuration description records for the modules stored in said ROM memory.

6. The digital audio/video interactive decoding system of claim 1 including a FLASH memory.

7. The digital audio/video interactive decoding system of claim 6 wherein at least one downloaded system module is stored in said FLASH memory after downloading.

8. The digital audio/video interactive decoding system of claim 7 wherein said configuration description block is comprised partially in said FLASH memory and partially in said ROM memory.

9. The digital audio/video interactive decoding system of claim 8 wherein the configuration description records corresponding to modules stored in said ROM memory are stored in the ROM portion of said configuration description block and wherein the configuration description records corresponding to modules stored in said FLASH memory are stored in the FLASH portion of said configuration description block.

10. The digital audio/video interactive decoding system of claim 6 wherein at least one downloaded system module is stored in said FLASH memory after downloading and wherein at least one downloaded system module is stored in said RAM memory after downloading.

11. The digital audio/video interactive decoding system of claim 10 wherein said configuration description block is comprised partially in said RAM memory, partially in said FLASH memory and partially in said ROM memory.

12. The digital audio/video interactive decoding system of claim 11 wherein the configuration description records corresponding to modules stored in said ROM memory are stored in the ROM portion of said configuration description block, wherein the configuration description records corresponding to modules stored in said FLASH memory are stored in the FLASH portion of said configuration description block, and wherein the configuration description records corresponding to modules stored in said RAM memory are stored in the RAM portion of said configuration description block.

13. The digital audio/video interactive decoding system of claim 10 wherein said configuration description block is comprised partially in said RAM memory and partially in said ROM memory.

14. The digital audio/video interactive decoding system of claim 6 wherein said configuration description block is stored entirely in said RAM memory and includes the configuration description records for the modules stored in said RAM memory, the configuration description records for the modules stored in said FLASH memory and the configuration description records for the modules stored in said ROM memory.

15. The digital audio/video interactive decoding system of claim 1 including:
   means for removing a module from said RAM memory; and
   means for removing said configuration description record corresponding to said removed module from said configuration description block.

16. The digital audio/video interactive decoding system of claim 6 including:
   means for removing a module from said RAM memory and said FLASH memory; and
   means for removing said configuration description record corresponding to said removed module from said configuration description block.

17. The digital audio/video interactive decoding system of claim 1 including means for attaching an external device.

18. The digital audio/video interactive decoding system of claim 17 wherein said means for attaching an external device comprises a PCMCIA slot.

19. The digital audio/video interactive decoding system of claim 17 wherein said means for attaching an external device comprises at least one of a serial and parallel port.

20. The digital audio/video interactive decoding system of claim 17 wherein an external device is attached to said means for attaching an external device and including:
   means for downloading a device driver module and corresponding description record from said external device; and
   means for adding said description record for said downloaded device driver module to said configuration description block.

* * * * *